April 5, 1966  D. B. KERN  3,244,056
BUSHING
Filed Feb. 18, 1963  2 Sheets-Sheet 1
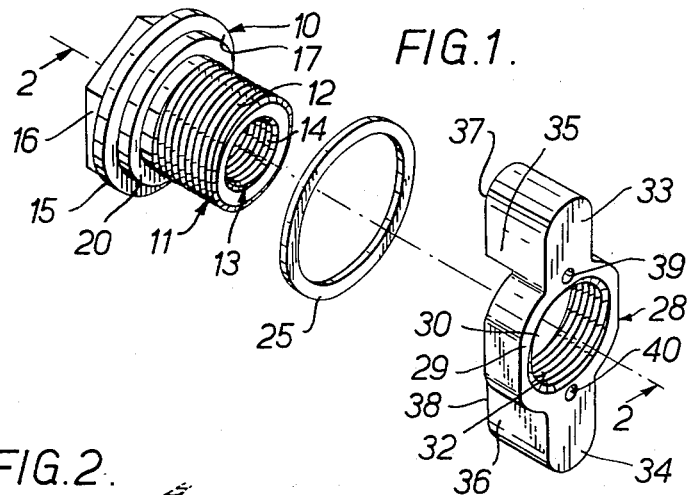
FIG.1.
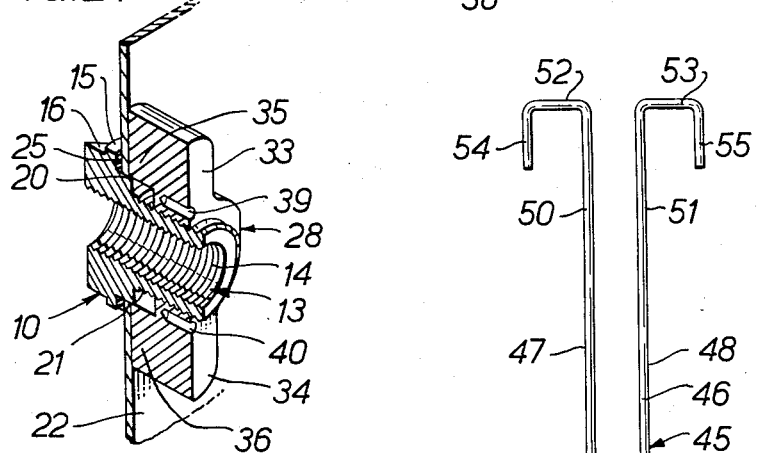
FIG.2.
FIG.3.
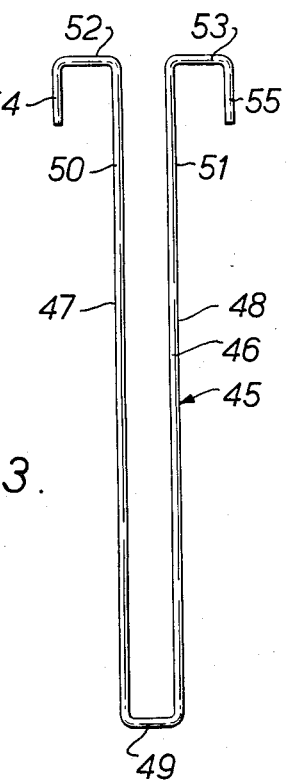
FIG.4.
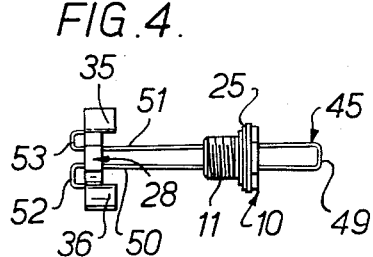
INVENTOR
DOUGLAS BRYAN KERN
Cushman, Darby & Cushman
ATTORNEYS April 5, 1966     D. B. KERN     3,244,056
BUSHING
Filed Feb. 18, 1963     2 Sheets-Sheet 2
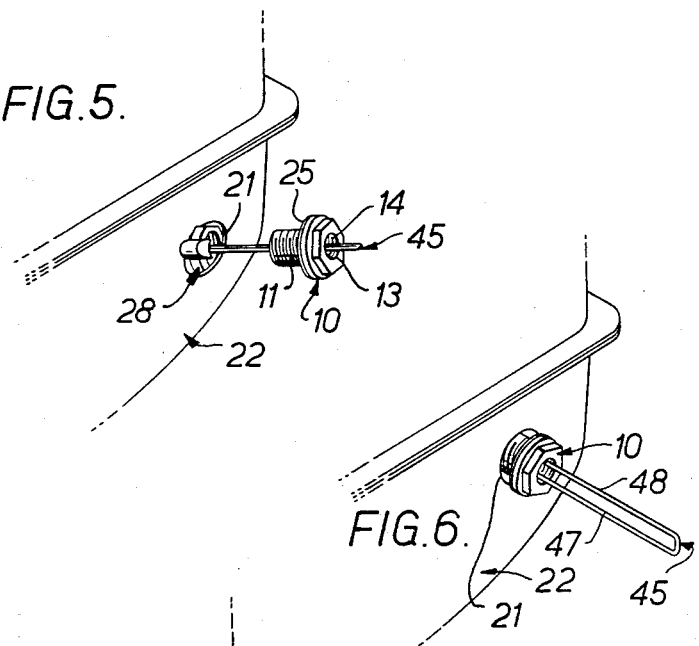
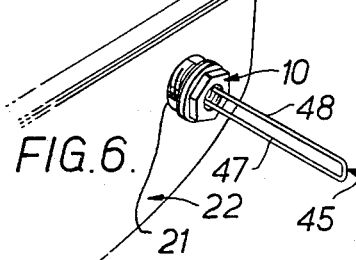
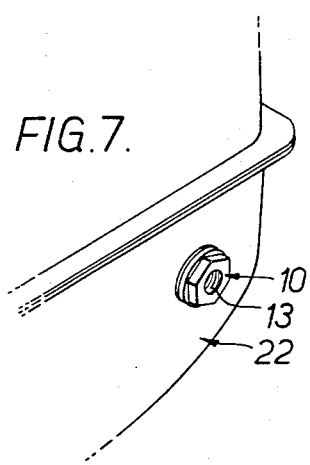
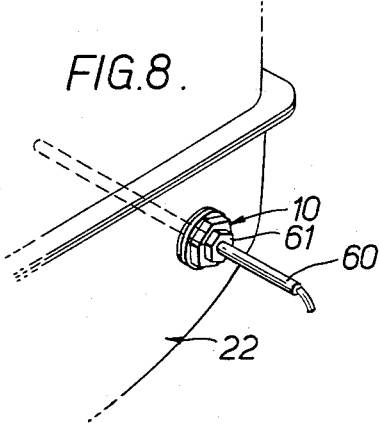
INVENTOR
DOUGLAS BRYAN KERN
Cushman, Darby & Cushman
ATTORNEYS

United States Patent Office 3,244,056
Patented Apr. 5, 1966

3,244,056
BUSHING
Douglas Bryan Kern, 4th Ave. and Albert St.,
Regina, Saskatchewan, Canada
Filed Feb. 18, 1963, Ser. No. 259,241
Claims priority, application Canada, Feb. 22, 1962,
842,920
2 Claims. (Cl. 85—3)

This invention relates to a bushing for blind wall installation.

In installing a bushing in a wall which is accessible from only one side, a difficult problem is encountered. The ordinary threaded nut and threaded bushing is useless because the nut cannot be applied from the other side of the wall. Furthermore, an ordinary nut is too large to be inserted through the hole which has been drilled to accommodate the bushing.

Various expedients are employed for installation of bolts and the like in blind holes. For example, toggle devices provided with expanding wings are inserted through the hole where the wings expand and provide anchorage for the bolt. There are many other variations of this type of device such as those which are employed in mining to provide anchorage for roof bolts and the like. However, none of these devices is satisfactory for use in applications in which a bushing is to be installed in a relatively thin wall in such a manner as to provide a fluid seal. This problem is encountered, for example, in the installation of an oil pan type block heater for automobiles. It is very desirable to effect installation of a device of this nature into the oil pan of an automobile without necessitating removal of the oil pan from the engine block. Since this involves drilling a hole in the oil pan for insertion of a block heater rod, some means must be found for effecting such installation conveniently and in such a manner as to provide a permanent positive seal and prevent the leakage of any oil therefrom.

I have found that this object can be accomplished by use of a specially designed nut adapted to co-operate with a hollow externally threaded bushing. This nut comprises an internally threaded ring and two diametrically opposed lugs projecting radially from the periphery of said ring providing a section of greater diameter than the remainder of said nut. When installed in an aperture in a wall this nut comprises together with the bushing an aperture gripping and sealing couple. Means are provided for inserting said nut in the aperture and retaining said nut in wall engaging relationship during threaded application of said bushing.

The present invention further provides a nut as hereinbefore described in which the lugs further project from the radial plane of said nut in an axial direction and form thereby together with said bushing an aperture gripping and sealing couple. The inserting and retaining means may comprise radially opposed axially aligned holes in said nut, said holes being adapted to grip and retain an insertion tool during application of said bushing to said wall.

As an example, and for the purpose of illustration only, a preferred embodiment of my invention is shown in the annexed drawing. This embodimet is particularly well adapted to the installation of a block heater in the oil pan of an automobile.

In the drawings, FIGURE 1 shows an exploded view of a bushing and nut according to the present invention.

FIGURE 2 is a section view along 2—2 in FIGURE 1 showing the nut and bushing of the present invention installed in an apertured wall.

FIGURE 3 shows a tool adapted for use with a nut and bushing of the present invention.

FIGURES 4, 5, 6, 7 and 8 illustrate the method of applying a block heater to the oil pan of an automobile engine.

In FIGURES 1 and 2, a bushing 10 has a cylindrical section 11 with suitable external threads 12 machined thereon. Aperture 13 is provided with internal threads 14. Bushig head 15 is provided with a hexagoal bolt head portion 16 and wall engaging portion 17. An aperture engaging section 20 on bushing head 15 is of substantially the same diameter as the diameter of the wall aperture 21 in tank wall 22 and is adapted to enter into said aperture 21 during sealing. The diameter of cylinder 11 is somewhat smaller than that of the wall aperture 21. Aperture engaging section 20 is encircled by a sealing ring 25 adapted to effect a fluid seal between wall engaging portion 17 of bushing head 15 and said wall aperture 21.

A nut 28 adapted for use with this bushing 10 comprises a ring portion 29 and aperture 30 provided with an internal thread 32 matching thread 12 on bushing 10. The nut 28 is provided with lugs 33 and 34 projecting radially therefrom. Lugs 33 and 34 are provided with shoulders 35 and 36 projecting out of the radial plane of ring 28 forming wall engaging faces 37 and 38. Axially aligned apertures 39 and 40 co-operate with a suitable insertion tool to provide means for inserting said nut 28 through aperture 21 drilled in the oil pan wall 22.

FIGURE 3 shows a plan view of a tool adapted to facilitate the insertion of nut 28 and the threading of bushing 10 thereon. This tool 45 has a generally U-shaped section 46 composed of two arms 47 and 48 joined by a bridging part 49. Arms 47 and 48 terminate at their free ends 50 and 51 in outwardly directed limbs 52 and 53 which themselves terminate in a rearwardly directed limbs 54 and 55 parallel to arms 47 and 48.

FIGURES 4, 5, 6, 7 and 8 illustrate various stages in the installation of a block heater into the wall of an automobile oil pan.

The procedure is described as follows. The two end sections 50 and 51 of tool 45 are inserted through the aperture 30 in nut 28 and then rearwardly extending limbs 54 and 55 are inserted firmly into apertures 39 and 40 on the face of said nut 28. A bushing 10 is then placed on tool 45 encircling section 46 of the tool (FIGURE 4). Liquid cement should be applied to sealing ring 25 in order to ensure a tight seal.

With the parts held firmly together in this manner, the nut 28 is inserted through aperture 21 in the wall 22 (see FIGURE 5) which is feasible since the smallest diametric dimension of ring 29 is smaller than the diameter of aperture 21. First one lug 33 of nut 28 is inserted and then this is followed by the second lug 34. When the entire nut 28 is through the aperture 21 and on the face of wall 22 opposite to the operator, the entire unit is turned until it is perpendicular to wall 22 and the wall engaging faces 37 and 38 of nut 28 are held tightly against the blind side of wall 22. Holding the end section 49 of tool 45 firmly the bushing 10 is pushed along arms 47 and 48 until the thread 12 on said bushing engages the internal thread 32 on the nut 28 (FIGURE 6), into which it is threaded and tightened firmly, effecting a fluid seal around said bushing.

Subsequently the tool limbs 54 and 55 are disengaged from nut apertures 39 and 40 by pushing the tool slightly inward through the bushing aperture 13 and then, by squeezing the arms 47 and 48 together the free ends of the tool including curved ends 50 and 51 are sufficiently small to be withdrawn through the said aperture 13 (FIGURE 7). The tool 45 would subsequently be discarded or used on another installation.

A block heater 60 fixed to a threaded bushing 61 is then screwed into aperture 13 in bushing 10 to complete the installation.

The bushing 10 and nut 28 can be manufactured from any suitable material such as brass, steel, iron, etc. The insertion tool 45 is most conveniently made of heavy steel wire.

There are many other applications for this invention and the invention is believed to be limited only by the claims which are hereby appended.

The embodiments of the invention in which an exclusive property or privilege is claimed are defined as follows:

1. For use in a blind wall bushing assembly which includes a hollow externally threaded bushing having a portion thereof of greater radial extent than the remainder of the bushing and means defining relatively a thin wall having an aperture therethrough to receive said bushing with said portion of greater radial extent engaging said wall peripherally of said aperture, the improvement which comprises a nut which is insertable through said aperture and adapted to secure said bushing to said wall, said nut comprising: an internally threaded ring, threadably receivable on said bushing downstream from said portion of greater radial extent, two diametrically opposed lugs projecting radially from the periphery of the ring providing a section of greater radial extent than the remainder of the nut, said lugs being of substantially lesser lateral width than the exterior diameter of said ring, the lugs having means further projecting from a radial plane which defines one face of the nut in an axial direction toward the bushing portion of greater radial extent, said lug further projecting means being substantially axially thicker than that lugs and located adjacent the radially outer extent of said lugs; and means on said nut for remoably retaining an insertion tool whereby said nut is insertable through said aperture by insertion of one of said lugs than the remainder of said nut through the aperture before the nut and bushing are threadably tightened, the lug means further projecting from the radial plane of the nut being adapted to engage the wall peripherally of said aperture on the opposite side of the wall from the bushing portion of greater radial extent.

2. A nut as in claim 1 in which said inserting and retaining means comprises radially opposed axially aligned holes in said nut, said holes being adapted to grip and retain an insertion tool during application of said bushing.

References Cited by the Examiner

UNITED STATES PATENTS

| | | |
|---|---|---|
| 620,872 | 3/1889 | Park. |
| 860,636 | 7/1907 | Church. |
| 1,398,083 | 11/1921 | Tibbetts. |
| 1,521,024 | 12/1924 | Hubener. |
| 1,784,637 | 12/1930 | Lindgren _____ 285—208 |
| 2,079,991 | 5/1937 | Farrington _____ 285—208 |

EDWARD C. ALLEN, *Primary Examiner.*